US012761156B2

(12) United States Patent
Zhou et al.

(10) Patent No.: US 12,761,156 B2
(45) Date of Patent: Oct. 13, 2026

(54) PRODUCT INSPECTION SYSTEM

(71) Applicants: Tyco Electronics (Shanghai) Co., Ltd., Shanghai (CN); TE Connectivity Services GmbH, Schaffhausen (CH)

(72) Inventors: Lei (Alex) Zhou, Shanghai (CN); Dandan (Emily) Zhang, Shanghai (CN); Roberto Francisco-Yi Lu, Bellevue, WA (US); Qing (Carrie) Zhou, Shanghai (CN); Rong Zhang, Shanghai (CN)

(73) Assignees: Tyco Electronics (Shanghai) Co., Ltd., Shanghai (CN); TE Connectivity Solutions GmbH, Schaffhausen (CH)

( * ) Notice: Subject to any disclaimer, the term of this patent is extended or adjusted under 35 U.S.C. 154(b) by 683 days.

(21) Appl. No.: 17/974,807

(22) Filed: Oct. 27, 2022

(65) Prior Publication Data

US 2023/0132348 A1 Apr. 27, 2023

(30) Foreign Application Priority Data

Oct. 27, 2021 (CN) ......................... 202111255165.X

(51) Int. Cl.
*G01N 21/88* (2006.01)
*G01N 21/17* (2006.01)

(52) U.S. Cl.
CPC ... *G01N 21/8803* (2013.01); *G01N 2021/177* (2013.01)

(58) Field of Classification Search
CPC ......... G01N 21/8803; G01N 2021/177; G01N 21/88; G01N 2021/845; B07C 5/342; B07C 5/02
See application file for complete search history.

(56) References Cited

U.S. PATENT DOCUMENTS 9,439,515 B2 9/2016 Kim
2006/0236792 A1* 10/2006 Hanna ..................... G01B 5/18 73/865.8

(Continued)

FOREIGN PATENT DOCUMENTS

CA 2715306 A1 1/2003
CN 1844898 A 10/2006

(Continued)

OTHER PUBLICATIONS

Chinese Office Action dated Nov. 15, 2024 with English translation, corresponding to Application No. 202111255165.X, 34 pages.

(Continued)

*Primary Examiner* — Oneal R Mistry
*Assistant Examiner* — Rachel L Roberts
(74) *Attorney, Agent, or Firm* — Barley Snyder

(57) ABSTRACT

A product inspection system includes a separating device separating a pair of adjacent products in a row of products by a predetermined distance, an image capturing device simultaneously capturing a plurality of images of a plurality of surfaces of all the products of the row of products that have been separated by the separating device, and a rotating device simultaneously rotating the products in the row of products separated by the separating device. The surfaces to be inspected of each product in the row of products are successively rotated to an orientation facing the image capturing device.

18 Claims, 5 Drawing Sheets

(56) References Cited

U.S. PATENT DOCUMENTS

| | | | | |
|---|---|---|---|---|
| 2015/0001867 | A1* | 1/2015 | Zhu | B25J 15/0061 294/81.6 |
| 2015/0177157 | A1* | 6/2015 | Edmondson | G06T 7/0004 348/125 |
| 2015/0204798 | A1* | 7/2015 | Nygaard | G01N 21/952 356/237.2 |
| 2016/0025644 | A1* | 1/2016 | Nygaard | G01B 11/2433 356/426 |
| 2016/0231253 | A1* | 8/2016 | Nygaard | B07C 5/342 |
| 2018/0241168 | A1 | 8/2018 | Zhou et al. | |
| 2020/0165073 | A1* | 5/2020 | Nishimura | B65G 47/902 |
| 2020/0255968 | A1* | 8/2020 | Mukaiyama | G01N 21/94 |

FOREIGN PATENT DOCUMENTS

| | | | | | |
|---|---|---|---|---|---|
| CN | 101009384 | A | | 8/2007 | |
| CN | 104181171 | A | | 12/2014 | |
| CN | 105836417 | A | * | 8/2016 | B65G 43/00 |
| CN | 107381003 | A | * | 11/2017 | B65G 47/74 |
| CN | 208418048 | U | | 1/2019 | |
| CN | 208567959 | U | | 3/2019 | |
| CN | 208614777 | U | | 3/2019 | |
| CN | 110425388 | A | | 11/2019 | |
| CN | 110875209 | A | | 3/2020 | |
| CN | 211768814 | U | | 10/2020 | |
| CN | 213580708 | U | * | 6/2021 | |
| CN | 113132547 | A | | 7/2021 | |
| JP | 2010032244 | A | | 2/2010 | |
| KR | 100954496 | B1 | | 4/2010 | |
| KR | 20100099487 | A | | 9/2010 | |
| KR | 101256631 | B1 | | 4/2013 | |
| KR | 101996345 | B1 | | 7/2019 | |
| KR | 102244549 | B1 | | 4/2021 | |
| TW | 201721158 | A | | 6/2017 | |

OTHER PUBLICATIONS

Peng, Tao et al., "A Mechanism for Narrow Cabin Assembly Quality Detecting by Vision", Journal, Aug. 2010, 5 pages, vol. 29, Issue 8, China Academic Journal Electronic Publishing House.

Li-Kang, Yang et al., "Development of Small Rotator for Automatic Picture Shoot", Journal, Jan. 2010, 3 pages, vol. 27, Issue 1, China Academic Journal Electronic Publishing House.

* cited by examiner

PRODUCT INSPECTION SYSTEM

CROSS-REFERENCE TO RELATED APPLICATION

This application claims the benefit of the filing date under 35 U.S.C. § 119(a)-(d) of Chinese Patent Application No. 202111255165.X, filed on Oct. 27, 2021.

FIELD OF THE INVENTION

The present invention relates to a product inspection system, in particular to a product inspection system suitable for capturing images of various surfaces of a product.

BACKGROUND

A product commonly has a plurality of surfaces to be inspected, so it is necessary to take images of the plurality of surfaces of the product. Usually only one surface image of one product is taken at a time, which leads to low image capturing efficiency and significantly reduces the efficiency of product quality inspection.

SUMMARY

A product inspection system includes a separating device separating a pair of adjacent products in a row of products by a predetermined distance, an image capturing device simultaneously capturing a plurality of images of a plurality of surfaces of all the products of the row of products that have been separated by the separating device, and a rotating device simultaneously rotating the products in the row of products separated by the separating device. The surfaces to be inspected of each product in the row of products are successively rotated to an orientation facing the image capturing device.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF THE EMBODIMENTS

Figure 1:
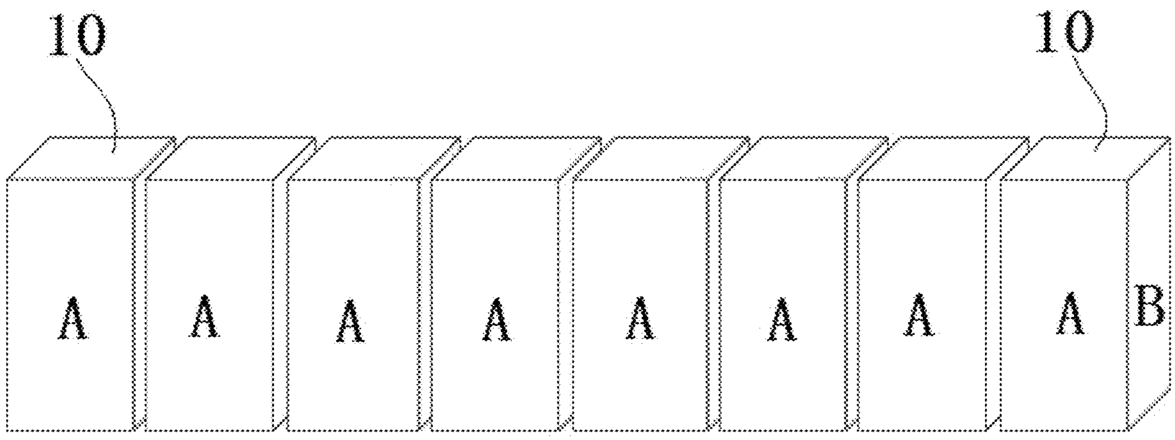
FIG. 1 is a perspective view of a row of products according to an embodiment, in which adjacent products are close to one another.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
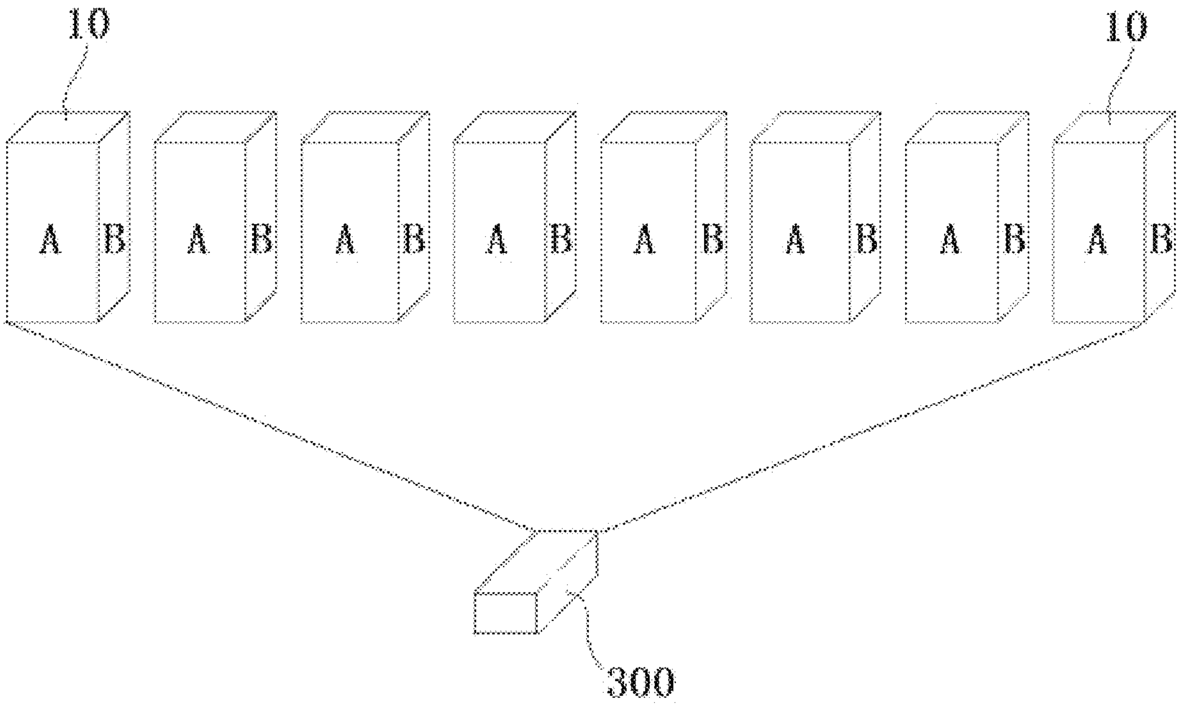
FIG. 2 is a perspective view of the row of products separated from one another by a predetermined distance, in which one of the surfaces of all the products of the row face an image capturing device.
Figure 3:
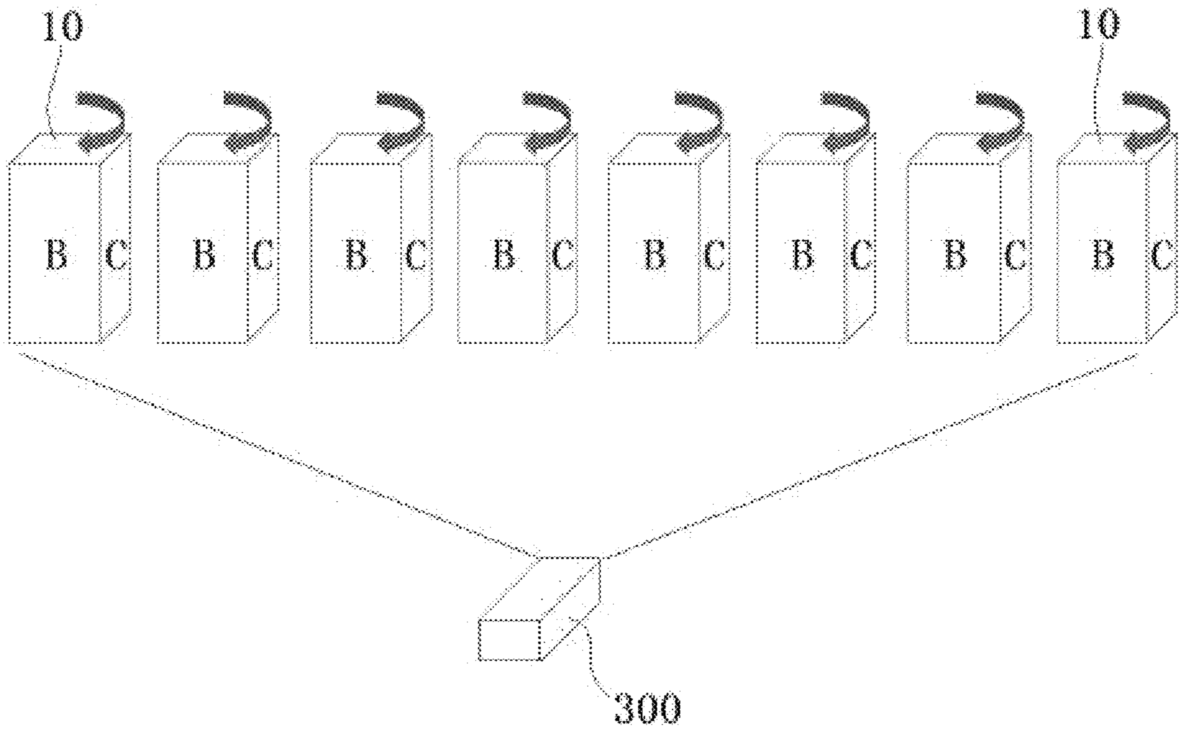
FIG. 3 is a perspective view of the row of products separated from one another and rotated to have another one of the surfaces facing the image capturing device.

FIG. 1 shows an illustrative view of a supplied row of products 10 according to an exemplary embodiment of the present invention, in which any two adjacent products 10 in the supplied row of products 10 are close to each other. FIG. 2 shows an illustrative view in which any two adjacent products 10 in the row of products 10 are separated by a predetermined distance, in which one surfaces of all products 10 in the row of products 10 are in an orientation facing the image capturing device 300. FIG. 3 shows an illustrative view in which another surface B of all products 10 in the row of products 10 shown in FIG. 2 are rotated to an orientation facing the image capturing device 300.

The product inspection system, according to an embodiment, mainly includes a separating device 100 (see FIGS. 4-7), a rotating device 200 (see FIG. 8) and an image capturing device 300 (see FIGS. 2 and 3). The separating device 100 is used to separate any two adjacent products 10 in the supplied row of products 10 by a predetermined distance. The image capturing device 300 is used to simultaneously capture images of the surfaces A, B, and C of all products 10 in the row of products 10 that have been separated by the separating device 100. The rotating device 200 is used to simultaneously rotate all products 10 in the row of products 10 that have been separated by the separating device 100 so that all surfaces A, B, and C of each product 10 in the row of products 10 to be inspected are sequentially rotated to the orientation facing the image capturing device 300.

As shown in FIG. 1, before being separated by the separating device 100, any two adjacent products 10 in the supplied row of products 10 are close to each other. At this time, if the images of the surfaces of all products in the row of products 10 were captured by the image capturing device 300, the images of the surfaces of two adjacent products 10 will be close to each other, and it will be difficult to separate and recognize. Therefore, in the present invention, the row of products 10 must be separated by the separating device 100 before taking the images.

As shown in FIG. 2, in the illustrated embodiment, when a first surface A of all products 10 in the row of products 10 are rotated to the orientation facing the image capturing device 300, the image capturing device 300 simultaneously captures the images of the first surfaces A of all products 10 in the row of products 10. As shown in FIGS. 2 and 3, after the image capturing device 300 captures the images of the first surfaces A of all products 10 in the row of products 10, the rotating device 200 rotates a second surface B of all products 10 in the row of products 10 to the orientation facing the image capturing device 300, and the image capturing device 300 simultaneously captures the images of the second surfaces B of all products 10 in the row of products 10. In this way, images of a plurality of surfaces A, B, and C to be inspected of each product 10 in the row of products 10 can be taken in turn.

In the embodiment shown in FIGS. 1 to 3, the row of products 10 includes eight products 10. However, the present invention is not limited to the illustrated embodiment, and the row of products 10 can include 2, 3, 4, 5, 6, 7 or more products 10.

Figure 4:
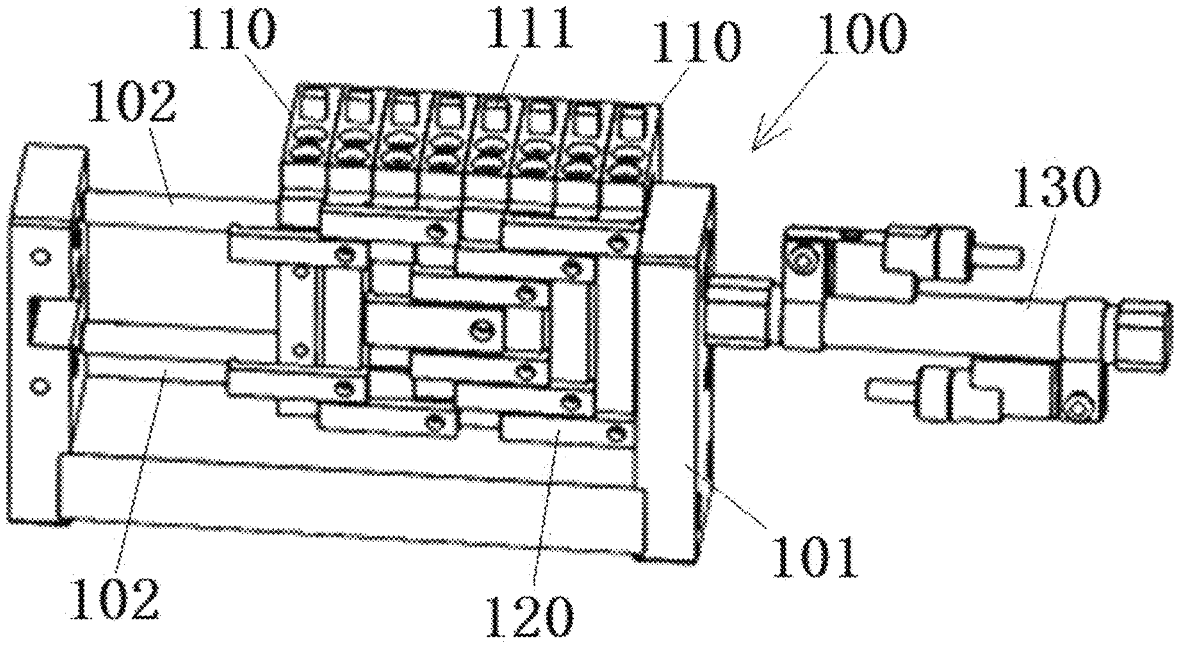
FIG. 4 is a perspective view of a separating device according to an embodiment, a row of carriers of the separating device is in an initial state in which the carriers are close to each other.
Figure 5:
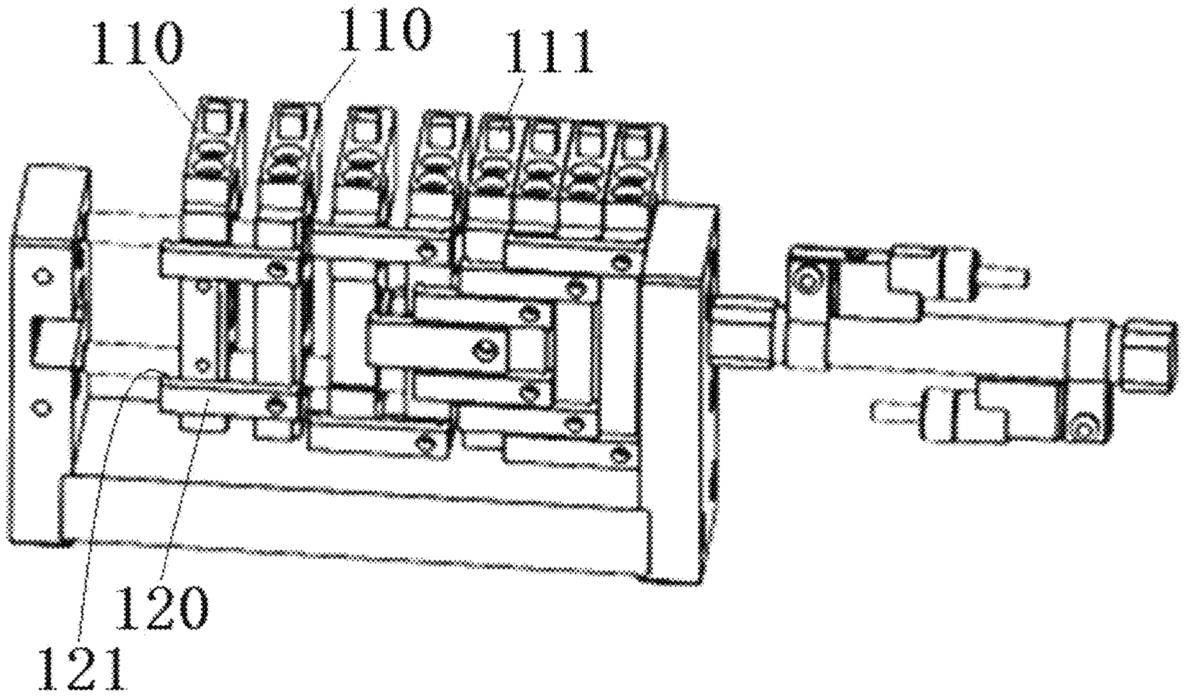
FIG. 5 is a perspective view of the row of carriers being moved from the initial state to a separate state.
Figure 6:
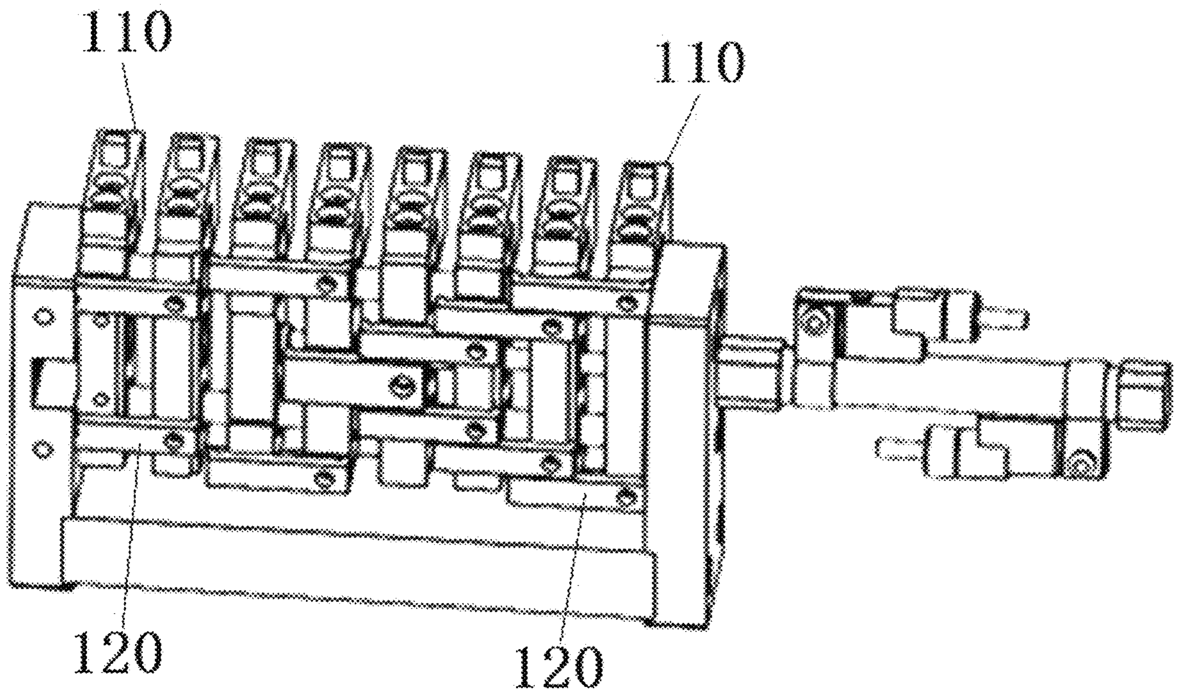
FIG. 6 is a perspective view of the row of carriers being moved to the separate state separated by a predetermined distance from each other.
Figure 7:
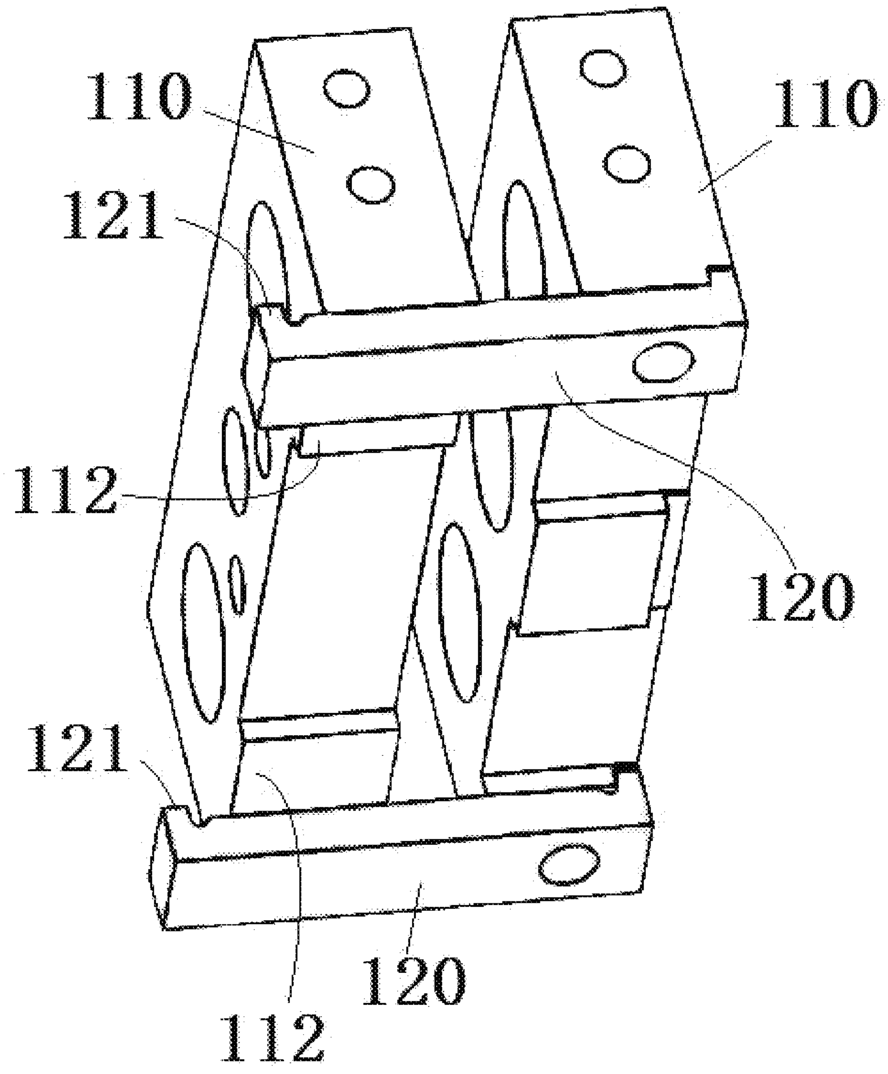
FIG. 7 is a perspective view of a pair of adjacent carriers of the separating device.

FIG. 4 shows an illustrative perspective view of a separating device 100 according to an exemplary embodiment of the present invention, in which a row of carriers 110 of the separating device 100 is in an initial state. FIG. 5 shows the process of the row of carriers 110 of the separating device 100 shown in FIG. 4 being moved from the initial state to the separate state. FIG. 6 shows an illustrative view of the row of carriers 110 of the separating device 100 shown in FIG. 4 being moved to the separate state in which the carriers 110 are separated by a predetermined distance from each other. FIG. 7 shows an illustrative perspective view of two adjacent carriers 110 in the separating device 100 shown in FIG. 4.

As shown in FIG. 4, the separating device 100 includes a support 101, a plurality of support rods 102, and a row of carriers 110. The plurality of support rods 102 are fixed to the support 101 and parallel to each other. The row of carriers 110 are slidably mounted on the support rod 102 and can be moved along the support rod 102. In the shown embodiment, the plurality of support rods 102 pass through the row of carriers 110 so that the row of carriers 110 is strung on the support rods 102.

As shown in FIGS. 4 to 6, in the illustrated embodiment, the row of carriers 110 can be switched between an initial state in which the carriers 110 are close to each other (the state shown in FIG. 4) and a separate state in which the carriers 110 are separated by a predetermined distance from each other (the state shown in FIG. 6). As shown in FIG. 1 and FIG. 4, the row of products 10 is in a state in which the products 10 are close to each other before being separated and is suitable for being simultaneously loaded onto the row of carriers 110 in the initial state. As shown in FIG. 6, after the row of products 10 is loaded on the row of carriers 110, the row of carriers 110 is switched to the separate state so that any two adjacent products 10 in the row of products 10 are separated by the predetermined distance.

As shown in FIGS. 4 to 7, in the illustrated embodiment, a plurality of limiting members 120 are arranged between two adjacent carriers 110 in the row of carriers 110, one end of the limiting member 120 is connected to one of the two adjacent carriers 110, and the other end forms a hook part 121 suitable for engaging with the other of the two adjacent carriers 110. When the row of carriers 110 is in the separate state, the hook part 121 of the limiting member 120 is engaged with the other of the two adjacent carriers 110 to limit the spacing between the two adjacent carriers 110 to the predetermined distance. When the row of carriers 110 is in the initial state, the hook part 121 of the limiting member 120 is separated from the other of the two adjacent carriers 110 by the predetermined distance to allow the two adjacent carriers 110 to move relative to each other.

As shown in FIG. 7, in the illustrated embodiment, a convex part 112 suitable for engagement with the hook part 121 of the limiting member 120 is formed on the carrier 110. When the row of carriers 110 is in the separate state, the hook part 121 of the limiting member 120 is engaged with the convex part 112 on the other of the two adjacent carriers 110.

As shown in FIG. 4, in the illustrated embodiment, the separating device 100 also includes a driving mechanism 130 mounted on the support 101, which is suitable for driving the row of carriers 110 to be switched between the initial state and the separate state. The driving mechanism 130 includes a ball screw, a nut, and a driver. The ball screw is rotatably mounted on the support 101. The nut is threaded with the ball screw and connected to the forward most carrier 110 (the leftmost carrier 110 in the figure) in the row of carriers 110. The driver is installed on the support 101 to drive the ball screw to rotate.

As shown in FIGS. 4 and 5, a first positioning post 111 is arranged on each carrier 110 in the row of carriers 110, and the first positioning post 111 is suitable for plugging into the insertion hole of the product 10 to fix the product 10 on the carrier 110.

Figure 8:
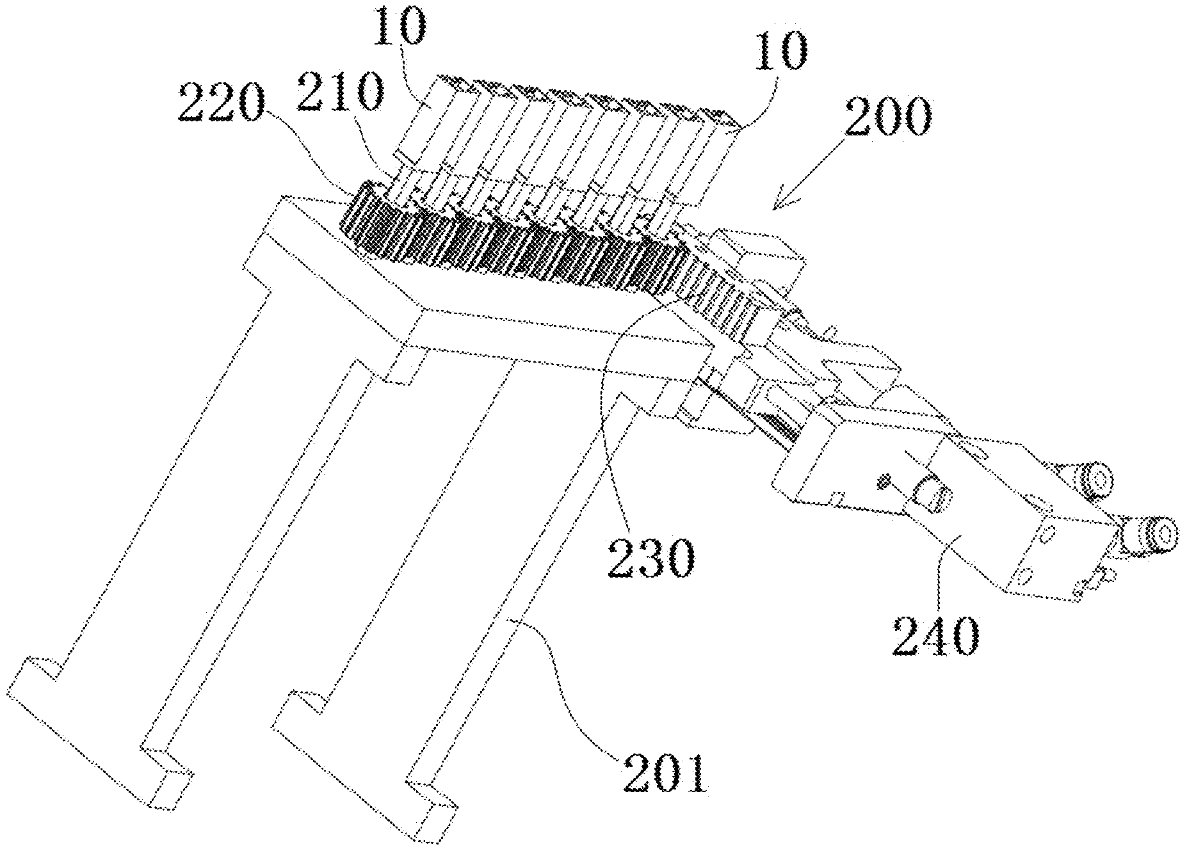
FIG. 8 is a perspective view of a rotating device according to an embodiment.

FIG. 8 shows an illustrative perspective view of a rotating device 200 according to an exemplary embodiment of the present invention. As shown in FIG. 8, in the illustrated embodiment, the rotating device 200 includes a support frame 201, a row of gears 220, a row of second positioning posts 210, and a rack 230. The row of gears 220 are rotatably mounted on the support frame 201, and two adjacent gears 220 mesh with each other. A row of second positioning posts 210 are respectively fixed to the row of gears 220 and can rotate coaxially with the corresponding gears 220. The rack 230 is movably mounted on the support frame 201 and meshed with the outermost gear 220 in the row of gears 220 (in the illustrated embodiment, meshed with the rightmost gear 220) to drive the row of gears 220 to rotate at the same time.

As shown in FIG. 8, in the illustrated embodiment, the spacing between the axes of two adjacent gears 220 in the row of gears 220 is equal to the spacing between two adjacent products 10 in the row of products 10 that have been separated by the separating device 100, so that the row of second positioning posts 210 can be inserted into the insertion holes of the row of products 10 that have been separated by the separating device 100 at the same time.

As shown in FIG. 8, in the illustrated embodiment, the rotating device 200 also includes a driving device 240, which is mounted on the support frame 201 to drive the rack 230 to move in a direction perpendicular to the axis of the gear 220.

In an embodiment, the product inspection system also includes a loading device suitable for clamping the row of products 10 at the same time, so that the row of products 10 can be loaded onto the separating device 100 or the rotating device 200 at the same time by the loading device. In this way, the loading efficiency of the row of products 10 can be improved.

In an embodiment, the product inspection system also includes a supply device suitable for supplying the row of products 10. The supplied row of products 10 are close to each other before being separated by the separating device 100.

In an embodiment, the product inspection system also includes a determination device suitable for determining whether the quality of the product 10 is qualified according to the captured images of all surfaces A, B, and C to be inspected of the product 10. The determination device can be a functional module stored as an algorithm on a non-transitory computer readable medium and running on a computer.

The product inspection system can take images of the surfaces A, B, C of all products 10 in a row of products at a time, which improves the image capturing efficiency and greatly improves the quality inspection efficiency of products 10.

It should be appreciated for those skilled in this art that the above embodiments are intended to be illustrative, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A product inspection system, comprising:

a separating device separating a pair of adjacent products in a row of products by a predetermined distance, the separating device includes a row of carriers;

an image capturing device simultaneously capturing a plurality of images of a plurality of surfaces of all the products of the row of products that have been separated by the separating device;

a rotating device simultaneously rotating the products in the row of products separated by the separating device, the surfaces to be inspected of each product in the row of products are successively rotated to an orientation facing the image capturing device; and a plurality of limiting members each provided between two adjacent carriers in the row of carriers, each limiting member between the two adjacent carriers has one end connected to a first of the two adjacent carriers in both an initial state and a separate state and an other end having a hook part engaging with a second of the two adjacent carriers in the separate state, at least one limiting member between two adjacent carriers is movable with the first adjacent carrier from the initial state to the separate state, the row of carriers abut in the initial state and are separated by the predetermined distance in the separate state.

2. The product inspection system according to claim 1, wherein the image capturing device simultaneously takes images of a plurality of first surfaces of the products in the row of products when the first surfaces are rotated to face the image capturing device.

3. The product inspection system according to claim 2, wherein a plurality of second surfaces of the products are rotated to face the image capturing device and the image capturing device simultaneously takes images of the second surfaces of the products after the images of the first surfaces are captured.

4. The product inspection system according to claim 1, wherein the separating device includes:

a support;

a plurality of support rods fixed to the support and parallel to each other; and the row of carriers slidably mounted on the support rods, the row of carriers is movable along the support rod between an initial state in which the carriers are close to each other and a separated state in which the carriers are separated by the predetermined distance from each other.

5. The product inspection system according to claim 4, wherein the row of products is simultaneously loaded on the row of carriers in the initial state, and after the row of products is loaded on the row of carriers, the row of carriers is switched to the separated state so that any two adjacent products in the row of products are separated by the predetermined distance.

6. The product inspection system according to claim 4, wherein the separating device includes a driving mechanism mounted on the support, the driving mechanism drives the row of carriers to be switched between the initial state and the separated state.

7. The product inspection system according to claim 6, wherein the driving mechanism includes:

a ball screw rotatably mounted on the support;

a nut threaded with the ball screw and connected to a forward most carrier in the row of carriers; and a driver installed on the support to drive the ball screw to rotate.

8. The product inspection system according to claim 4, wherein each carrier in the row of carriers has a first positioning post pluggable into an insertion hole of the products to fix the products on the carrier.

9. The product inspection system according to claim 8, wherein the rotating device includes:

a support frame;

a row of gears rotatably mounted on the support frame and meshed with each other;

a row of second positioning posts fixed to the row of gears to coaxially rotate with the gears; and a rack movably mounted on the support frame and meshed with an outermost gear in the row of gears to drive the row of gears to simultaneously rotate.

10. The product inspection system according to claim 9, wherein a distance between a pair of axes of two adjacent gears in the row of gears is equal to the predetermined distance, the row of second positioning posts are simultaneously insertable into the insertion holes of the row of products separated by the separating device.

11. The product inspection system according to claim 10, wherein the rotating device includes a driving device installed on the support frame to drive the rack to move in a direction perpendicular to the axes of the gears.

12. The product inspection system according to claim 1, wherein the hook part of each limiting member between two adjacent carriers is engaged with the other of the two adjacent carriers to limit the spacing between two adjacent carriers to the predetermined distance when the row of carriers is in the separate state, and the hook part of each limiting member between two adjacent carriers is separated from the other of the two adjacent carriers by the predetermined distance to allow the two adjacent carriers to move relative to each other when the row of carriers is in the initial state.

13. The product inspection system according to claim 12, wherein each of the carriers has a convex part engageable with the hook part of the limiting member and, when the row of carriers is in the separated state, the hook part of the limiting member engages the convex part on the other of the two adjacent carriers.

14. The product inspection system according to claim 1, further comprising a loading device simultaneously clamping the row of products to simultaneously load the row of products onto the separating device or the rotating device.

15. The product inspection system according to claim 1, further comprising a supply device supplying the row of products, any two adjacent products in the row of products are close to each other before being separated by the separating device.

16. The product inspection system according to claim 1, further comprising a determination device determining whether a quality of the product is qualified according to the images of all surfaces to be inspected of the product.

17. The product inspection system according to claim 1, wherein the at least one limiting member is only movable with the first adjacent carrier from the initial state to the separate state.

18. A product inspection system, comprising:

a separating device separating a pair of adjacent products in a row of products by a predetermined distance, the separating device includes a row of carriers, each carrier in the row of carriers has a first positioning post pluggable into an insertion hole of the products to fix the products on the carrier;

an image capturing device simultaneously capturing a plurality of images of a plurality of surfaces of all the products of the row of products that have been separated by the separating device; and a rotating device simultaneously rotating the products in the row of products separated by the separating device, the surfaces to be inspected of each product in the row of products are successively rotated to an orientation facing the image capturing device.

* * * * *